United States Patent [19]
Alpert et al.

[11] Patent Number: 5,659,679
[45] Date of Patent: Aug. 19, 1997

[54] METHOD AND APPARATUS FOR PROVIDING BREAKPOINTS ON TAKEN JUMPS AND FOR PROVIDING SOFTWARE PROFILING IN A COMPUTER SYSTEM

[75] Inventors: Donald Alpert, Santa Clara; Gary N. Hammond, Campbell, both of Calif.

[73] Assignee: Intel Corporation, Santa Clara, Calif.

[21] Appl. No.: 454,087

[22] Filed: May 30, 1995

[51] Int. Cl.$^6$ ................................................ G06F 11/34
[52] U.S. Cl. ................................. 395/183.1; 395/183.14; 395/376; 364/280.8; 364/DIG. 1
[58] Field of Search .................... 395/183.01, 183.06, 395/183.1, 183.11, 183.14, 182.18, 375, 800; 364/265.6, 267.91, 280.8, 275.5

[56] References Cited

U.S. PATENT DOCUMENTS

| | | | |
|---|---|---|---|
| 4,176,394 | 11/1979 | Kaminski et al. | 364/200 |
| 4,179,734 | 12/1979 | O'Leary | 364/200 |
| 4,279,016 | 7/1981 | Leininger et al. | 364/200 |
| 4,306,287 | 12/1981 | Huang | 364/200 |
| 4,403,284 | 9/1983 | Sacarisen et al. | 364/200 |
| 4,409,654 | 10/1983 | Wada et al. | 364/200 |
| 4,488,227 | 12/1984 | Miu et al. | 364/200 |
| 4,598,364 | 7/1986 | Gum et al. | 364/300 |
| 4,709,324 | 11/1987 | Kloker | 364/200 |
| 4,725,947 | 2/1988 | Shonai et al. | 364/200 |
| 4,755,997 | 7/1988 | Takahashi | 371/19 |
| 4,783,731 | 11/1988 | Miyazaki et al. | 364/200 |
| 4,924,382 | 5/1990 | Shouda | 364/200 |
| 5,095,426 | 3/1992 | Senta | 395/375 |
| 5,197,138 | 3/1993 | Hobbs et al. | 395/375 |
| 5,237,666 | 8/1993 | Suzuki et al. | 395/375 |
| 5,249,278 | 9/1993 | Krauskopf | 934/115 |
| 5,265,213 | 11/1993 | Weiser et al. | 395/375 |
| 5,319,763 | 6/1994 | Ho et al. | 395/425 |
| 5,341,500 | 8/1994 | Moyer et al. | 395/725 |
| 5,361,348 | 11/1994 | Nakamoto | 395/575 |
| 5,367,550 | 11/1994 | Ishida | 377/39 |
| 5,371,894 | 12/1994 | DiBrino | 395/800 |
| 5,379,301 | 1/1995 | Sato et al. | 371/19 |
| 5,386,519 | 1/1995 | Nakamura et al. | 395/375 |
| 5,448,705 | 9/1995 | Nguyen et al. | 395/375 |
| 5,493,664 | 2/1996 | Doi | 395/427 |
| 5,530,804 | 6/1996 | Edgington et al. | 395/183.06 |
| 5,533,192 | 7/1996 | Hawley et al. | 395/183.04 |
| 5,564,028 | 10/1996 | Swoboda et al. | 395/375 |

OTHER PUBLICATIONS

*Pentium™ Processor User's Manual, vol. 3: Architecture and Programming Manual*, pp. 14–1 –14–27 and 17–1 –17–9 (Intel Corporation 1994).
*80960KB Programmer's Reference Manual*, pp. 10–1 –10–8 (Intel Corporation 1988).

*Primary Examiner*—Robert W. Beausoliel, Jr.
*Assistant Examiner*—Albert Decady
*Attorney, Agent, or Firm*—Blakely, Sokoloff, Taylor & Zafman

[57] ABSTRACT

According to one aspect of the invention, an apparatus for providing the source address of an instruction which causes a branch to be taken (e.g., instructs the processor to transfer the flow of execution) is described. In one embodiment, a processor includes a circuit coupled to a source address storage area. In response to the processor executing an instruction which instructs the processor to transfer the flow of execution to another instruction, the circuit stores in the source address storage area the address of the instruction which is causing the transfer in flow of execution.

According to another aspect of the invention, a method for profiling is provided. According to this method, a starting address for execution is stored. Then for the instruction currently being executed, it is determined if that instruction will cause a branch from a source address to a destination address. If it was determined a branch will be taken, then the source address of the branch is stored in a source address storage area, the destination address of the branch is stored in another storage area, and a handler is executed. The handler stores indications indicating the instructions identified by the addresses within the address range defined by the starting address and the source address have been executed.

15 Claims, 6 Drawing Sheets

METHOD AND APPARATUS FOR PROVIDING BREAKPOINTS ON TAKEN JUMPS AND FOR PROVIDING SOFTWARE PROFILING IN A COMPUTER SYSTEM

BACKGROUND OF THE INVENTION

1. Field of the Invention

The invention relates to the field of computer systems. More specifically, the invention relates to software debugging.

2. Background Information

Software debugging is the detecting, locating, and correcting of logical and/or syntactical errors in a computer program. Debug hardware is often included in a processor for use by a software debug program. Typically, the debug program uses the debug hardware to allow the programmer to examine data and check conditions during the execution of another computer program. Thus, the debugging features of a processor provide programmers with valuable tools for looking at the dynamic state of the processor.

A typical debug feature, when enabled, reports a debug event in response to a certain condition(s) being meet. The term "event" is used herein to refer to any action or occurrence to which a computer system might respond (e.g., hardware interrupts, software interrupts, exceptions, faults, traps, aborts, machine checks, debug events). Upon recognizing an event, a processor's event handling mechanism causes the processor to interrupt execution of the current process, store the interrupted process' execution environment (i.e., the information necessary to resume execution of the interrupted process), and invokes the appropriate operating system handler. Upon completing the servicing of the event, the invoked handler instructs the processor to resume execution of the interrupted process using the previously stored execution environment. The appropriate handler for debug events is the debug handler. Thus, in response to each debug event, the debug handler is executed. The debug handler is a portion of the debug program and it allows the programmer to perform a variety of debugging techniques. When the programmer is finished, the programmer can cause the debug handler to instruct the processor to resume the interrupted process using the process' previously stored execution environment.

One prior art processor which includes debugging hardware is the Intel® 80960KB manufactured by Intel Corporation of Santa Clara, Calif. The 80960KB provides for a "branch-trace mode" and an "instruction-trace mode." When the instruction-trace mode is enabled, the processor generates an instruction-trace event each time an instruction is executed. Debug software can use the instruction-trace mode to "single-step" the processor—i.e., interrupt execution after each instruction to allow the debug software to perform various debug techniques. When the branch-trace mode is enabled, the processor generates an branch-trace event each time an instruction that causes a branch (also termed as a "jump") to be taken is executed. An instruction that causes a branch to be taken is one that causes the processor to transfer flow of execution to another instruction (e.g., a jump instruction, a branch instruction, etc..). A taken branch typically transfers the flow of execution in a non-sequential manner—i.e., to an instruction which does not sequentially follow the instruction causing the branch to be taken. A branch-trace event is not generated for conditional-branch instructions that do not result in a branch being taken.

One limitation of this prior art branch-trace mode is that the source address of the branch (i.e., the address identifying the instruction that causes the branch to be taken) is not stored. As a result, this source address is not available for use by the debug handler. One prior art method of capturing the source address of a taken branch is to use the instruction-trace mode in conjunction with the branch-trace mode. According to this method, the instruction-trace mode is used to single step the processor and the address of the previously executed instruction is stored during each instruction-trace event. As a result, when a branch-trace event occurs, the address stored in response to the most recent instruction-trace event is the destination address of the taken branch. However, this method lacks utility in that it greatly degrades performance because the instruction-trace mode causes an event to occur after the execution of every instruction.

Another prior art processor which includes debugging hardware is the Intel Pentium™ processor manufactured by Intel Corporation. The Pentium processor provides for a "single-step trap" which is enabled by a TF flag. When enabled, a single-step trap occurs after the execution of the current instruction. Debug software can use the single-step trap to single step the processor. One limitation of this prior art processor is that the INT instructions clear the TF flag. Therefore, software debuggers which single-step code must recognize and emulate INT n or INTO instructions rather than executing them directly. This results in additional overhead when single-stepping. Another limitation of this prior art processor is that additional circuitry had to be included to reconcile the single-step trap with the other events. This circuitry terminates single stepping if an external interrupt occurs. In addition, when both an external interrupt and a single-step interrupt occur together, this circuitry clears the TF flag, saves the return address or switches tasks, and examines the external interrupt input before the first instruction of the single-step handler executes. If the external interrupt is still pending, then it is serviced—i.e., that external interrupt's handler is executed. During the execution of the external interrupt's handler, the single-step trap is disabled. Upon completion of the external interrupt's handler, the processor returns to executing the single-step handler. Thus, operating system routines (such as the external interrupt handlers) are not normally run in single step mode. To run operating system routines in the single step mode, a INTn instruction which calls an interrupt handler must be single stepped. As a result, this processor does not allow single stepping to be enabled on operating system routines as they interact with other programs.

One prior art technique of debugging is "profiling." Profiling is the counting of the number of times each instruction in a routine or program is executed. This count information can be used to determine which sections of code are software performance bottlenecks. These sections of code may then be optimized or restructured to increase performance. The prior art method of profiling uses single-stepping. For example, a prior art profiling program executing on a Pentium processor stores a profiling handler as the debug handler and enables the single-step trap to cause an exception after each instruction. After execution of each instruction, the processor executes the profiling handler which increments a count corresponding to the executed instruction. A limitation of this prior art method is that it greatly degrades performance because an event occurs after the execution of every instruction. This degradation in performance is so severe that use of this method is impractical.

SUMMARY

According to one aspect of the invention, an apparatus for providing the source address of an instruction which causes a branch to be taken (e.g., instructs the processor to transfer the flow of execution) is described. In one embodiment, a processor includes a circuit coupled to a source address storage area. In response to the processor executing an instruction which instructs the processor to transfer the flow of execution to another instruction, the circuit stores in the source address storage area the address of the instruction which is causing the transfer in flow of execution.

According to another aspect of the invention, a method for profiling is provided. According to this method, a starting address for execution is stored. Then for the instruction currently being executed, it is determined if that instruction will cause a branch from a source address to a destination address. If it was determined a branch will be taken, then the source address of the branch is stored in a source address storage area, the destination address of the branch is stored in another storage area, and a handler is executed. The handler stores indications indicating the instructions identified by the addresses within the address range defined by the starting address and the source address have been executed.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention.

This application describes an invention for providing the source address of a taken jump which results in a breakpoint event. In addition, this application describes an invention for providing profiling using branch breakpoint events.

One Embodiment of the Invention

Figure 1:
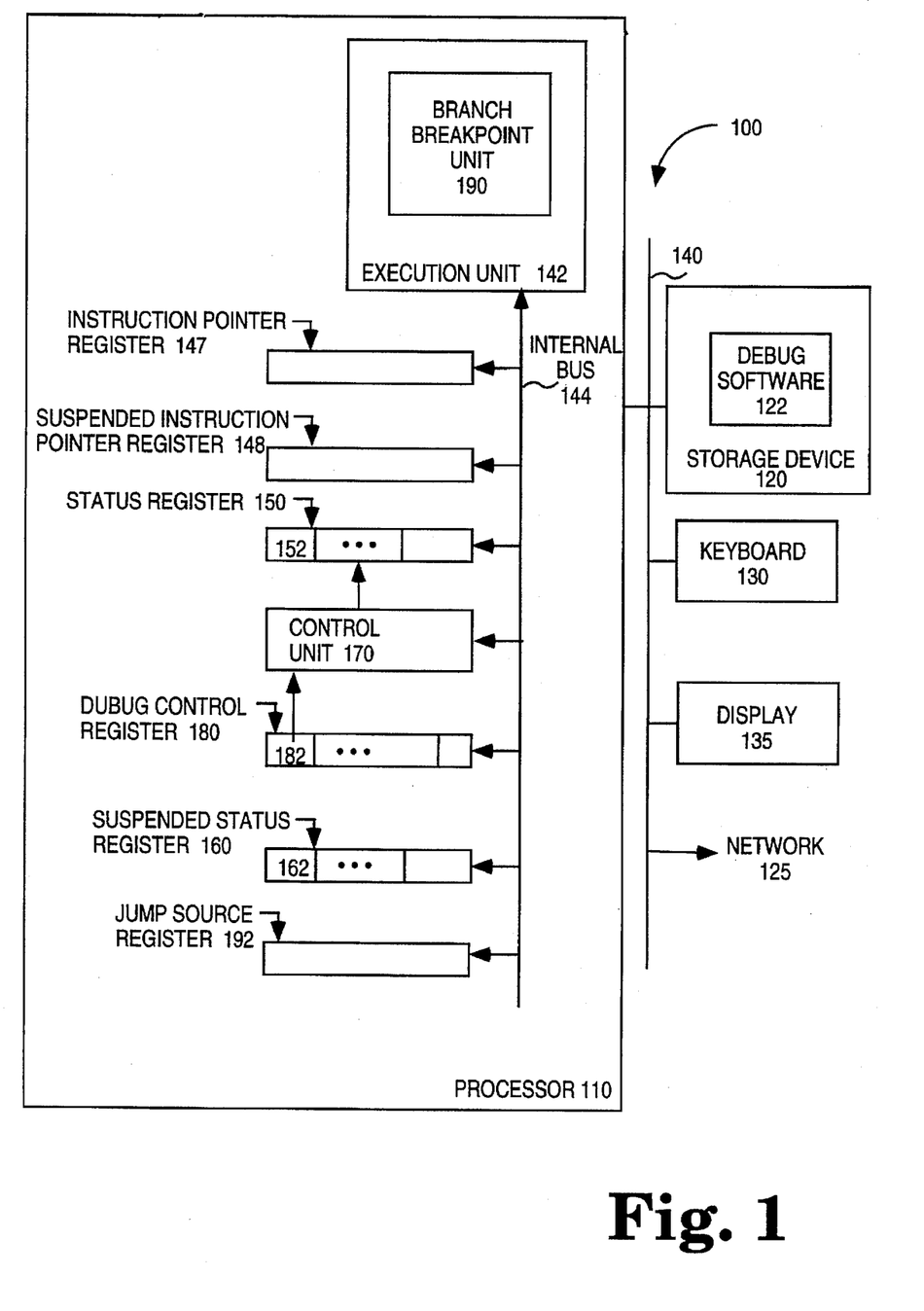
FIG. 1 illustrates an exemplary computer system incorporating the teachings of the invention.

FIG. 1 shows a block diagram illustrating an exemplary computer system 100 incorporating the teachings of the invention. The exemplary computer system includes a processor 110, a storage device 120, a network 125, and a bus 140. Processor 110 is coupled to storage device 120 and network 125 by bus 140. In addition, a number of user input/output devices, such as a keyboard 130 and a display 135, are also coupled to bus 140. Processor 110 represents a central processing unit of any type of architecture, including a CISC or RISC type architecture. In addition, processor 110 could be implemented on one or more chips. Storage device 120 represents one or more mechanisms for storing data. For example, storage device 120 may include read only memory (ROM), random access memory (RAM), magnetic disk storage mediums, optical storage mediums, and/or flash memory devices. While this embodiment is described in relation to a single processor computer system, the invention could be implemented in a multi-processor computer system. In addition, while this embodiment is described in relation to a 64-bit computer system, the invention is not limited to a 64-bit computer system.

FIG. 1 additionally illustrates that processor 110 includes an execution unit 142, instruction pointer register 147, suspended instruction pointer register 148, status register 150, suspended status register 160, control unit 170, debug control register 180, jump source register 192, and internal bus 144. Of course, processor 110 contains additional circuitry which is not necessary to understanding the invention.

Internal bus 144 couples the elements of processor 110 together. Execution unit 142 is used for executing instructions. Instruction pointer register 147 is used for storing an address of an instruction currently being executed by execution unit 142. Status register 150 is used for storing status information concerning the process currently executing on execution unit 142. The contents of instruction pointer register 147 and status register 150 make up the execution of environment of the process currently executing on processor 110.

Status register 150 includes an enable bit 152 for enabling and disabling recognition of branch breakpoint events. When enable bit 152 indicates an enable state, branch breakpoint events are recognized. In contrast, when enable bit 152 indicates a disable state, branch breakpoint events are not recognized.

Execution unit 142 includes a branch breakpoint unit 190. Branch breakpoint unit 192 includes circuitry for detecting whether a instruction currently being executed by said processor is causing a branch (also termed as a "jump") to be taken. An instruction that causes a branch to be taken is one that causes the processor to transfer flow of execution to another instruction (e.g., a jump instruction, a branch instruction, etc.). A taken branch typically transfers the flow of execution in a non-sequential manner—i.e., to an instruction which does not sequentially follow the instruction causing the branch to be taken. A branch breakpoint event is not generated for conditional-branch instructions that do not result in a branch being taken. While enable bit 152 indicates the enable state, branch breakpoint unit 192 transmits a signal each time it detects a branch is or will be taken. Upon receiving this signal from branch breakpoint unit 192, execution unit 142 recognizes a branch breakpoint event (also termed as a "break on jump event") and transmits the signal to jump source storage area 192.

In response to this signal, jump source register 192 stores the source address of the taken branch. In this manner, the source address of a taken jump is made available to the debug handler executed in response to the branch breakpoint event. This provides greatly improved performance over prior art processors that required the use of single stepping to provide the source address of taken jumps. While jump source register 192 is described as being a dedicated register for storing the source address, alternative embodiments could be implemented such that jump source register 192 is a general purpose register.

In response to each event (including branch breakpoint events), execution unit 142: 1) suspends execution of the current process; 2) copies the execution environment of the suspended process from instruction pointer register 147 and status register 150 into suspended instruction pointer register 148 and suspended status register 160, respectively; and 3) executes the appropriate handler.

FIG. 1 also illustrates that storage device 120 has stored therein debug software 122 for execution on processor 110 to provide for the debugging of other software (e.g., applications). Of course, storage device 120 preferably contains additional software which is not necessary to understanding the invention.

While the described embodiment stores the execution environment of the suspended process in registers on the processor, alternative embodiments could use any number of techniques for temporarily storing the execution environment of a suspended process. For example, see Shanley, Tom and Anderson, Don, *ISA System Configuration*, MindShare, Inc. (1993). In addition, while the described embodiment uses bits in registers on processor 110 for storing indications (e.g., enable bit 152), alternative embodiments could use any number of techniques. For example, alternative embodiments could store these indications off chip (e.g., in storage device 120) and/or could use multiple bits for each indication.

Figure 2:
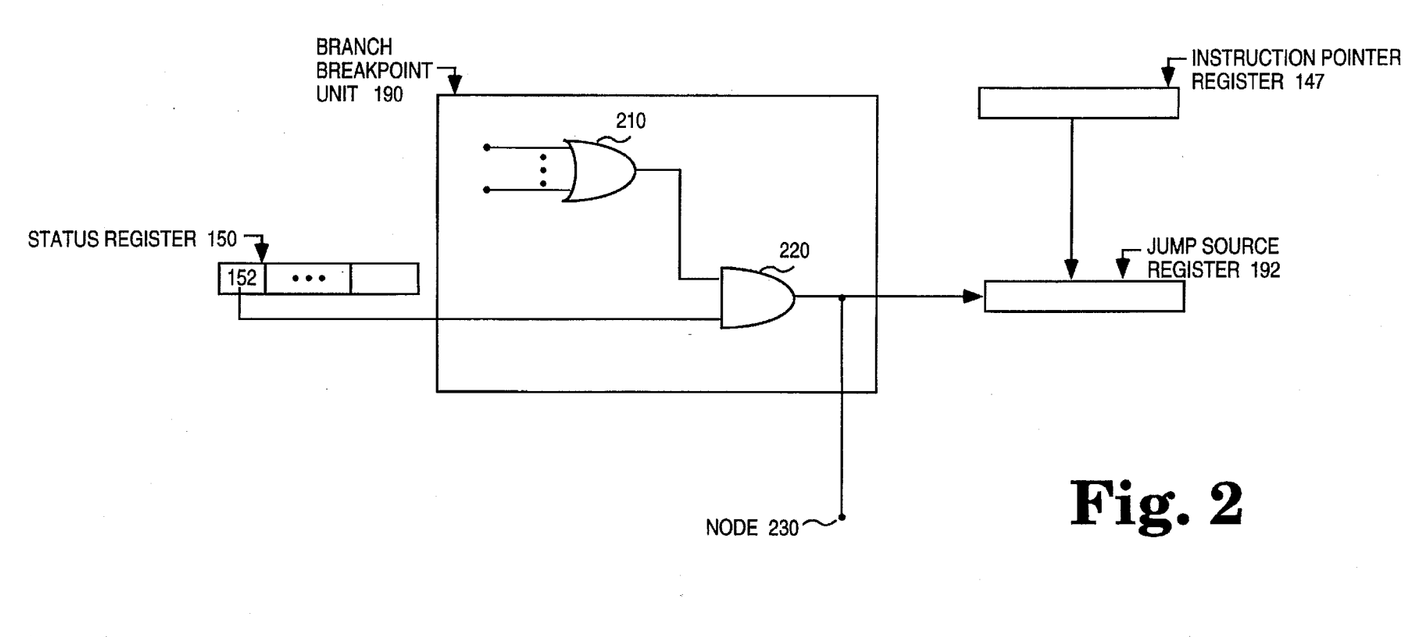
FIG. 2 illustrates a block diagram of exemplary circuitry for implementing branch breakpoint unit 190 of FIG. 1 according to one embodiment of the invention.

FIG. 2 illustrates a block diagram of exemplary circuitry for implementing branch breakpoint unit 190 according to one embodiment of the invention. FIG. 2 shows branch breakpoint unit 190 includes an OR gate 210 having as inputs a number of conditions. Each of these conditions indicates when a branch will or has been taken. The signals representing these conditions are generated by the execution pipeline(s). Thus, these conditions may be generated prior to, during, or after the execution of an instruction. Branch breakpoint unit 190 also includes an AND gate 220. The output of OR gate 210 is coupled to the input of AND gate 220. The other input of AND gate 220 is coupled to receive enable bit 152 from status register 150. Thus, if the output of OR gate 210 is high and branch breakpoint events are enabled, the output of AND gate 220 indicates a branch breakpoint event should occur. The output of AND gate 220 is coupled to node 230 for signaling a branch breakpoint event should be recognized. In addition, the output of AND gate 220 is coupled to jump source register 192.

Jump source register 192 is also coupled to receive the contents of instruction pointer register 147. In response to receiving the signal from AND gate 220 indicating a branch breakpoint event will occur, jump source register 192 stores the contents of instruction pointer register 147. In this manner, the source address of a taken branch is stored such that it is available for use by the debug handler executed in response to the branch breakpoint event. Thus, the jump source address is made available without the use of other debug modes, such as a single stepping mode. This greatly increases the performance of software debugging over prior art processors.

While one embodiment of branch breakpoint unit 190 has been described in relation to FIG. 2, alternative embodiments could use any number of different circuitry configuration to implement the invention. For example, in one alternative embodiment the jump source register is coupled to the output of OR gate 210, rather than the output of AND gate 220. In this alternative embodiment, the debug handler would need to be implemented such that a jump is not caused prior to the contents of the jump source register being accessed. As another example, another alternative embodiment could store the source address of the jump in memory (e.g., in a fixed location in memory, in a stack data structure in memory, etc.) As another example, the invention could be implemented in software.

Figure 3:
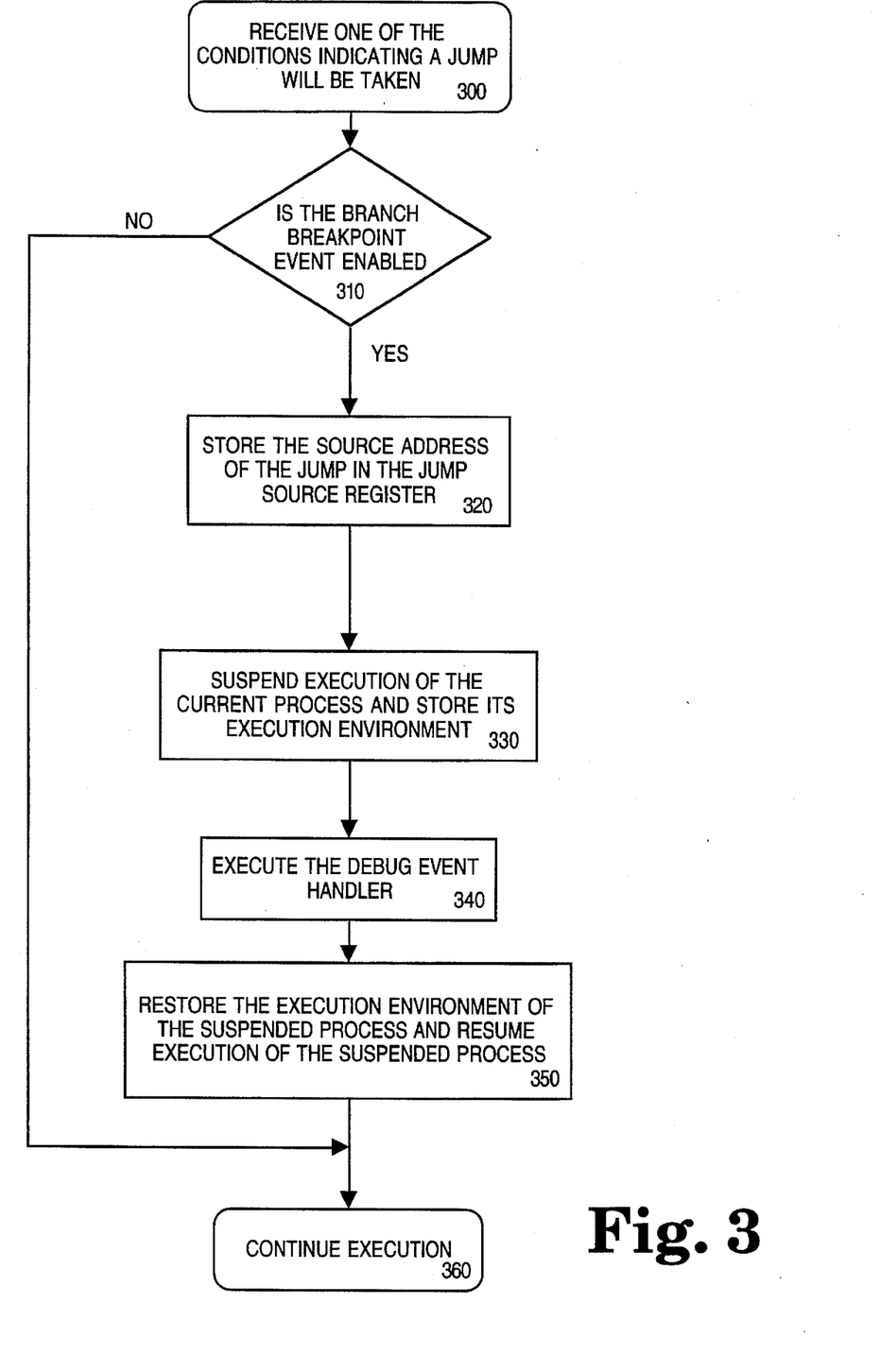
FIG. 3 shows a flow diagram illustrating the operation of one embodiment of the invention.

FIG. 3 shows a flow diagram illustrating the operation of one embodiment of the invention. At step 300, one of the conditions indicating jump will be taken is received. From step 300, flow passes to step 310.

As shown in step 310, it is determined whether the branch breakpoint event is enabled. If the branch breakpoint event is enabled, a branch breakpoint event is caused and flow passes to step 320. Otherwise, flow passes to step 360. In the described embodiment, this determination is made by inspecting the state of enable bit 152.

As shown in step 320, the source address of the jump is stored in the jump source register and flow passes to step 330.

As shown in step 330, the execution of the current process is suspended and its execution environment is stored. From step 330, flow passes to step 340. In the described embodiment, processor 110 stores the current process' execution environment by copying the contents of instruction pointer register 147 and status register 150 into suspended instruction pointer register 148 and suspended status register 160, respectively.

At step 340, the debug handler is executed and flow passes to step 350. In one embodiment, the debug handler is a generic handler which services multiple events, including branch breakpoint events. The debug event handler knows which event has occurred by inspecting an event status register located on processor 110. The event status register stores a number of bits which indicate which event has occurred—e.g., when an event occurs (such as a branch breakpoint event), the state these bits is altered to indicate which event has occurred. Upon completion of the debug handler, flow passes to step 350. Typically, the last instruction of a handler to be executed is one which instructs the processor to resume the suspended process.

As shown in step 350, the execution environment of the suspended process is restored and execution of the suspended process is resumed. From step 350, flow passes to step 360. In the described embodiment, the execution environment of the suspended process is restored by copying the execution environment stored in suspended instruction pointer register 148 and suspended status register 160 into instruction pointer register 147 and status register 150, respectively.

At step 360, the flow diagram ends with the processor continuing execution.

Figure 4:
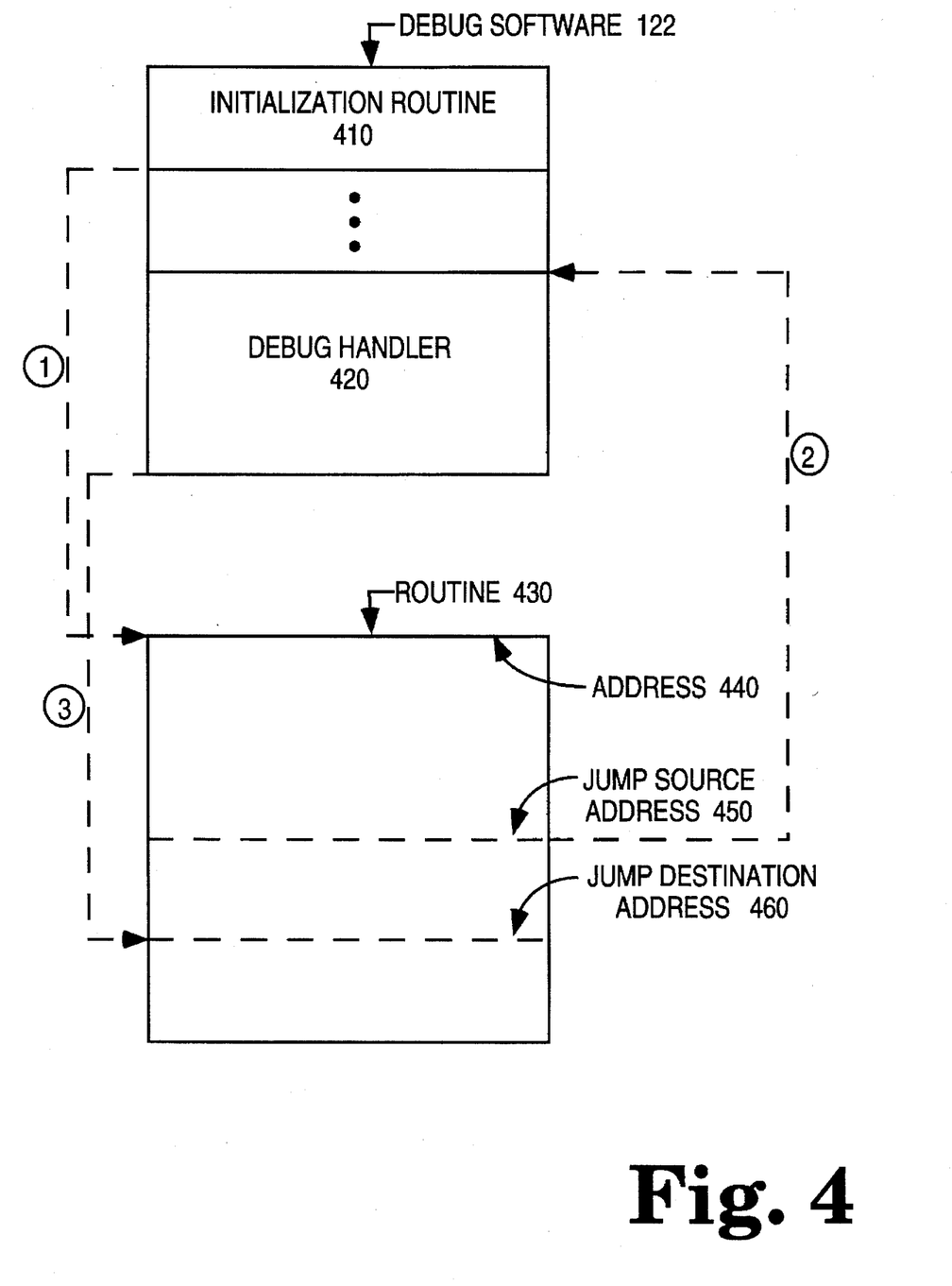
FIG. 4 is an exemplary block diagram illustrating the branches taken during profiling according to one embodiment of the invention.

FIG. 4 is an exemplary block diagram illustrating the branches taken during profiling according to one embodiment of the invention. FIG. 4 shows debug software 122 including an initialization routine 410 and a debug handler 420. In addition, FIG. 4 shows a routine 430 on which profiling will be performed. Routine 430 starts at address 440.

Figure 5A:
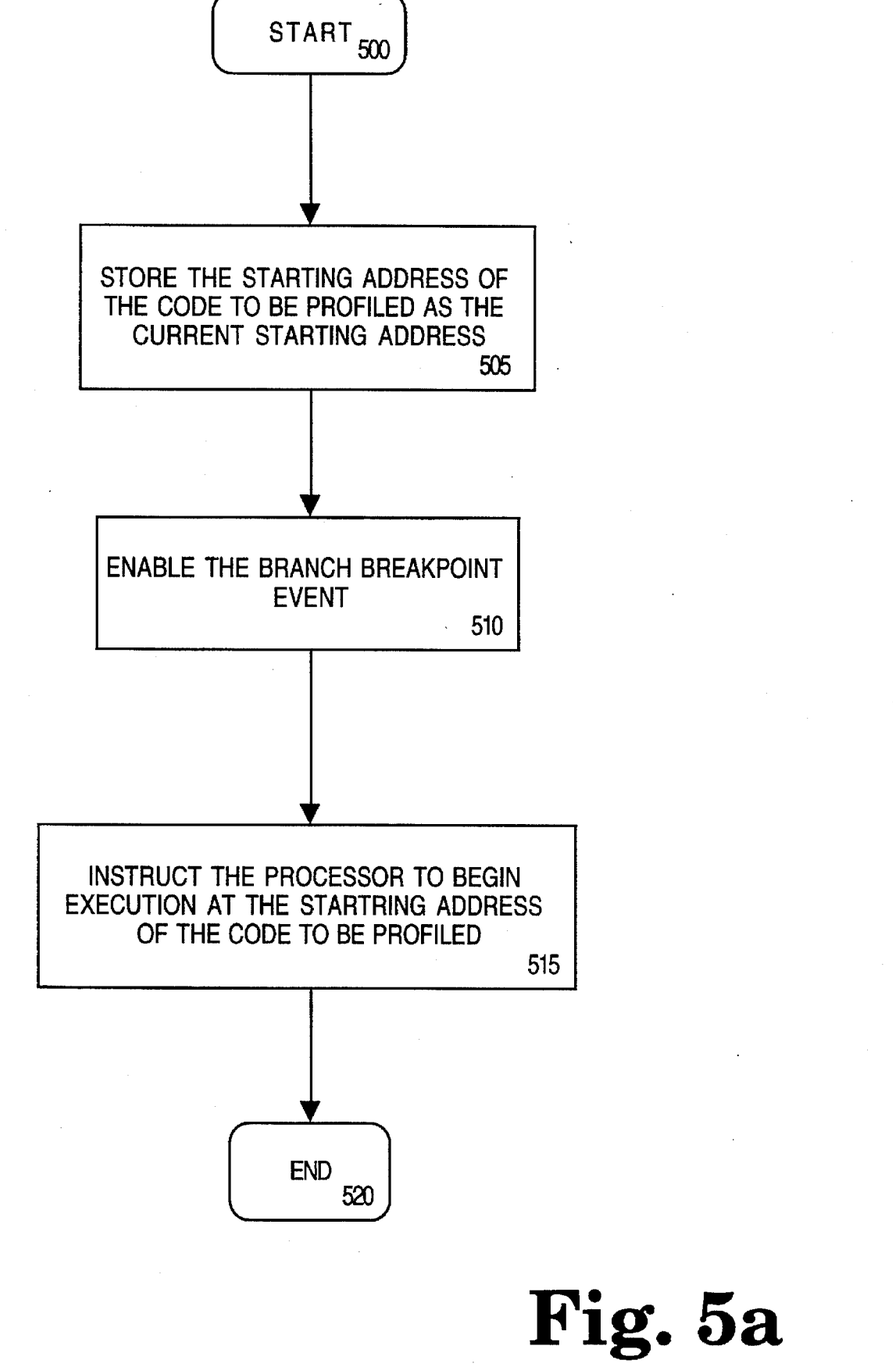
FIG. 5a shows a flow diagram illustrating the operation of initialization routine 410 of FIG. 4 according to one embodiment of the invention.

FIG. 5a shows a flow diagram illustrating the operation of initialization routine 410 according to one embodiment of the invention. The flow diagram starts at step 500. From step 500, flow passes to step 505.

At step 505, the starting address of the code to be profiled is stored as the current starting address and flow passes to step 510. In the example shown in FIG. 4, initialization routine 410 stores address 440 as the current starting address. In one embodiment, the current starting address is stored off chip (e.g., at a known location in storage device 120). However, alternative embodiments could store the current starting address in a storage area on processor 110.

As shown in step 510, the branch breakpoint event is enabled and flow passes to step 515. In the described embodiment, the branch breakpoint event is enabled by altering the state of enable bit 152 to indicate an enable state.

At step 515, the initialization routine instructs the processor to begin executing at the starting address of the code to be profiled and flow passes to step 520. In the example shown in FIG. 4, initialization routine 410 instructs the processor to begin execution starting at address 440.

At step 520, the flow diagram ends. In the example shown in FIG. 4, the processor begins executing routine 430 starting at address 440 as shown by line 1.

During the execution of routine 430, the processor eventually reaches an instruction corresponding to jump source address 450 which causes a jump to be taken to jump destination address 460. Upon detecting this taken branch, the steps in FIG. 3 will be performed starting at step 300. As previously described, flow passes from step 300 to step 310.

As shown in step 310, it is determined whether the branch breakpoint event is enabled. If the branch breakpoint event is enabled, a branch breakpoint event is caused and flow passes to step 320. Otherwise, flow passes to step 360. In the present example, the state of enable bit 152 was altered in step 510 to enable branch breakpoint events and flow passes to step 320.

As shown in step 320, the source address of the jump is stored in the jump source register and flow passes to step 330. In the example shown in FIG. 4, jump source address 450 is stored in jump source register 192 as previously described in relation to FIGS. 1 and 2.

As shown in step 330, the execution of the current process is suspended and its execution environment is stored. From step 330, flow passes to step 340. In the described embodiment, the processor executes the instruction causing the jump before the branch breakpoint event occurs. As a result, the jump destination address is stored in instruction pointer register 147 prior to the occurrence of the branch breakpoint event. However, the processor 110 stores the current processes execution environment by copying the contents of instruction pointer register 147 and status register 150 into suspended instruction pointer register 148 and suspended status register 160, respectively. Thus, the jump destination address is stored in suspended instruction pointer register 148. Thus, in the present example, suspended instruction pointer register 148 has stored therein jump destination address 460.

At step 340, the debug handler is executed and flow passes to step 350. In the present example, debug handler 420 is executed.

Figure 5B:
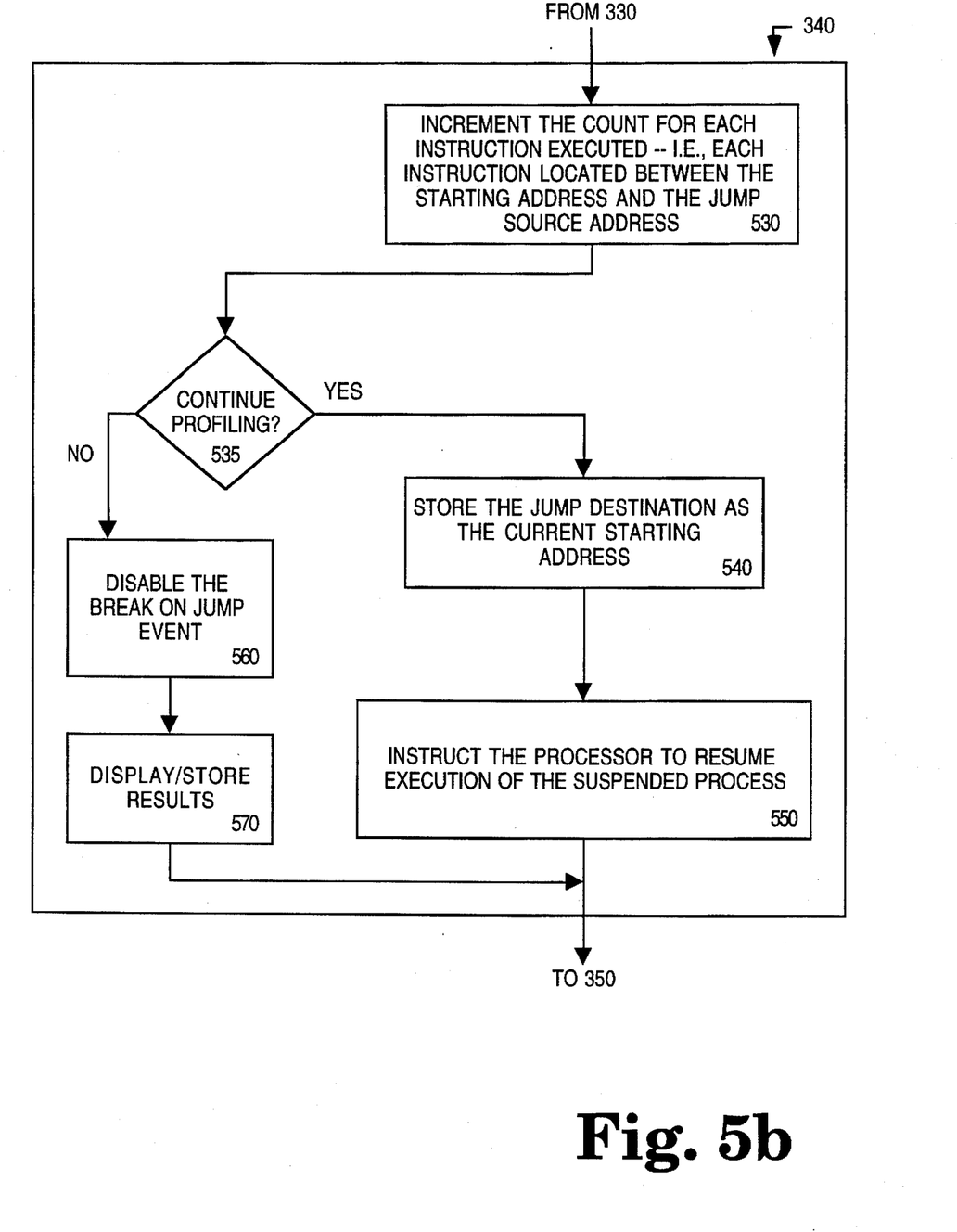
FIG. 5b shows a flow diagram illustrating the steps performed in step 340 of FIG. 3 by debug handler 420 of FIG. 4 according to one embodiment of the invention.

FIG. 5b shows a flow diagram illustrating the steps performed in step 340 by debug handler 420 according to one embodiment of the invention. FIG. 5b shows that flow passes from step 330 to step 530.

As shown in step 530, the count for each instruction executed is incremented and flow passes to step 535. In the example shown in FIG. 4, execution began at address 440 and a branch was not taken until jump source address 450. As a result, it is known that the instructions between address 440 and jump source address 450 were executed. Address 440 is available because it was stored by initialization routine 410 as the current starting address. Jump source address 450 is available because it was stored in jump source register 192. Debug handler 420 generates and maintains a data structure containing a count for each instruction in routine 430 which is executed. Debug handler 420 increments the corresponding count for each instruction identified by the addresses within the address range defined by address 440 and jump source address 450. In this manner, debug handler 420 maintains a record of the number of times each instruction is executed. The data structure maintained by debug handler 420 can be implemented in any number of ways, includes a linked list, an array, a hash table, etc.

As shown in step 535, it is determined whether to continue profiling. If it is determined to continue profiling, flow passes to step 540. Otherwise, flow passes to step 560. This determination can be made in any number of ways.

As shown in step 540, the jump destination is stored as the current starting address and flow passes to step 550. As previously described in relation to step 330, the jump destination address is stored in suspended instruction pointer register 148. Thus, in the present example, jump destination address 460 is stored in suspended instruction pointer register 148. Debug handler 420 copies jump destination address 460 from suspended instruction pointer register 148 and stores it in memory as the new current starting address.

As shown in step 550, the debug handler instructs the processor to resume execution of the suspended process. From step 550 flow passes to step 350.

Assuming it was determined to discontinue profiling in step 535, step 560 shows that the branch breakpoint event is disabled. In the described embodiment, this is accomplished by altering the state of enable bit 182 to indicate the disable state. From step 560 flow passes to step 570.

As shown in step 570, the count data is displayed and/or stored and flow passes to step 350.

As shown in step 350, the execution environment of the suspended process is restored and execution of the suspended process is resumed. From step 350, flow passes to step 360. In the described embodiment, the execution environment of the suspended process is restored by copying the execution environment stored in suspended instruction pointer register 148 and suspended status register 160 into instruction pointer register 147 and status register 150, respectively.

At step 360, the flow diagram ends with the processor continuing execution.

In this manner, profiling is performed using only branch breakpoint events. Thus, the execution of routine 430 is only interrupted for debugging purposes when an instruction is executed which causes a branch to be taken. Since jump instructions are typically only 10% of executed instructions, the overhead of handling these events for profiling is substantially reduced (approximately 10×) as compared to the prior art methods which utilize single stepping (As previously described, single stepping causes an event after the execution of every instruction).

To further improve the flexibility and performance of computer system 100 in relation to branch breakpoint events, FIG. 1 also shows computer system 100 includes a control unit 170 and a debug control register 180.

In one embodiment, processor 110 is operable in two modes; a kernel mode (also termed as the "system mode" or "privileged mode") and a user mode (also termed as the "application mode"). The system mode is used for executing operating system type code (e.g., events handlers), while the user mode is used for execution non-operating system type code (e.g., applications). Operating system code is software responsible for controlling the allocation and usage of hardware resources such as memory, processor time (e.g., multitasking), disk space, peripheral devices, etc. The operating system is the foundation on which application, such as word-processing and spreadsheet programs, are built. The kernel mode provides additional resources not available in the user mode. In one embodiment, for example, access to additional storage areas, execution of additional instructions (sometimes referred to as "privileged instructions"), and manipulation of critical components of the system (e.g., memory, input/output ports, etc.) is provided for only in the kernel mode. Thus, these additional resources are protected from use while the processor is in the user mode. In one embodiment, these additional resources include suspended instruction pointer register 148, status register 150, suspended status register 160, and debug control register 180. These modes of operation of processor 110 are also termed as "privilege levels." The selection between the different mode of processor 110 is performed by mode indication 156 stored in status register 150.

As previously described, in response to each event the processor suspends execution of the current process, stores the execution environment of the suspended process in suspend instruction pointer register 148 and suspended status register 160, and begins execution of the appropriate handler. Since the contents of status register 150 are copied into suspended status register 160 when the execution environment of the suspended process is stored, the state of enable bit 152 and mode indication 156 (mode indication 166 in suspended status register 160 corresponds to mode indication 156) used by the suspended process are preserved.

In addition to the above steps, execution unit 142 additionally performs the step of transmitting a signal to enable control unit 170 in response to each event. When enabled, control unit 170 loads status register 150 with handler status information. The bit of this handler status information which corresponds to enable bit 152 is acquired from an enable bit 182 stored in debug control register 180. Thus, the state of enable bit 152 is temporarily altered to the state of enable bit 182 during the execution of the different handlers. The programmer may store enable bit 182 in an enable state or a disable state, thereby causing branch breakpoint unit 190 to be enabled or disabled during the execution of the different handlers. In addition, control unit 170 causes the processor to switch to the kernel mode by storing mode indication 156 in the appropriate state.

Upon completion of each handler executed in response to an event, the execution environment of the previously suspended process is restored—i.e., the contents of suspended status register 160 are copied into status register 150. As a result, enable bit 152 is restored to its state prior to the event—i.e., the state used by the suspended process. In addition, the state of mode indication 156 is restored to its state prior to the event. Thus, if the suspended process was executing in the user mode, restoring the execution environment of the suspended process causes the processor to switch to operating in the user mode by altering the state of mode indication 156. The execution of the suspended process is then resumed.

In this manner, one indication is provided that allows the programmer to selectively enable branch breakpoint events during the execution of handlers (e.g., enable bit 182), and a separate indication is provided that allows the programmer to selectively enable branch breakpoint events during the execution of other software (e.g., applications). As a result, the programmer is allowed the flexibility of selectively enabling branch breakpoint events during the execution of either handlers, applications, or both.

Thus, an application programmer can improve performance during the debugging of applications by causing the operating system to alter the states of the enable bits such that branch breakpoint events are enabled during the execution of applications and disabled during the execution of handlers. For example, during profiling, branch breakpoint events need not be enabled during the execution of debug handler 430. Thus, initialization routine 410 is implemented to cause the processor to: 1) switch to the kernel mode; 2) store enable bit 162 in the enable state; 3) store enable bit 182 in the disable state; and 4) switch back to the user mode (See step 510 of FIG. 5a). By storing enable bit 162 in the enable state and causing the processor to switch back to the user mode, the state of enable bit 152 is selected for the user mode. Initialization program 410 then instructs processor 110 to execute routine 430 in the user mode. Since enable bit 152 is stored in the enable state, branch breakpoint events are recognized during the execution of routine 330 in the user mode. However, since enable bit 182 is stored in the disable state, branch breakpoint events are not recognized during the execution of handlers in the kernel mode (e.g., debug handler 420). In this manner, the performance of debugging applications is improved by avoiding the unnecessary recognition and servicing of debug events during the execution of handlers, such as the debug handler.

In a similar manner, a system programmer can improve performance during the debugging of handlers by causing the operating system to alter the states of the enable bits to cause branch breakpoint events to be enabled during the execution of handlers and disabled during the execution of applications. In this manner, the performance of debugging operating system routines is improved by avoiding the unnecessary recognition and servicing of debug events during the execution in the user mode.

Furthermore, either a system or applications programmer may desire to enable debug events during execution of all software. For example, the programmer would do this to debug problems related to the interaction between handlers and applications. This would be accomplished in a manner similar to that described above.

While this embodiment is described in relation a branch breakpoint event, storing a bit for identifying whether certain circuitry should be enabled during the servicing of an event could be implemented for any number of events and any number of different circuits. In addition, while this embodiment describes a computer system in which the enablement of the debug events depends on the current state of the enable bits in status register 150 and these enable bits are altered upon entering and exiting the kernel mode, alternative embodiments can use any number of techniques to provide separate indications for separately selecting the enablement of debug events in different modes. For example, an alternative embodiment can have one register in which all of the enable bits are stored and could have circuitry which chooses which bits in that register are currently used based on the current mode of the processor.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A processor comprising:

a source address storage area;

a first circuit coupled to said source address storage area, said first circuit configured to store in said source address storage area a first address at which a first instruction is stored in response to said processor determining that said first instruction instructs said processor to transfer flow of execution to a second instruction stored at a second address;

an instruction pointer storage area;

a suspended instruction pointer storage area; and a second circuit coupled to said instruction pointer storage area and said suspended instruction pointer storage area, said second circuit configured to store said second address in said suspended instruction pointer storage area and store a third address in said instruction pointer storage area in response to said processor determining that said first instruction instructs said processor to transfer flow of execution.

2. The processor of claim 1, wherein said third address identifies a starting address of a handler.

3. The processor of claim 1, further comprising means for enabling and disabling said first circuit.

4. The processor of claim 3, further comprising means for enabling and disabling said second circuit.

5. A processor comprising:

a first storage area configured to store a current instruction pointer;

a second storage area;

a third storage area;

an execution unit coupled to said first, said second, and said third storage areas, said execution unit configured to execute instructions identified by said instruction pointer, and in response to said processor determining that an instruction identified by said current instruction pointer causes said processor to transfer flow of execution to an instruction stored at a destination address, said execution unit causing said current instruction pointer to be stored in said second storage area and said destination address to be stored in said third storage area.

6. The processor of claim 5, wherein said execution unit is also configured to cause said current instruction pointer to identify a starting instruction in a handler in response to storing said destination address in said third storage area.

7. An apparatus for use in a computer system comprising:

a storage device;

a first series of instructions stored in said storage device for execution by said processor, said first series of instructions including a first instruction and a second instruction respectively stored at a first address and a second address;

a second series of instructions stored in said storage device for execution by said processor, said second series of instructions including a third instruction stored at a third address; and a processor coupled to said storage device, said processor comprising:

a source address storage area;

a first circuit coupled to said source address storage area, said first circuit configured to store in said source address storage area said first address in response to said processor determining that said first instruction instructs said processor to transfer flow of execution to said second instruction;

an instruction pointer storage area;

a suspended instruction pointer storage area;

a second circuit coupled to said instruction pointer storage area and said suspended instruction pointer storage, said second circuit configured to store said second address in said suspended instruction pointer storage area and said third address in said instruction pointer storage area in response to said processor determining that said first instruction instructs said processor to transfer flow of execution to said second instruction.

8. A computer system comprising:

a storage device;

a handler stored in said storage device; and a processor coupled to said storage device containing:

a first storage area for storing a current instruction pointer;

a second storage area;

a third storage area; and an execution unit coupled to said first, said second and said third storage areas, said execution unit configured to execute instructions identified by said instruction pointer, and in response to said processor determining that an instruction identified by said current instruction pointer causes said processor to transfer flow of execution to an instruction stored at a destination address, said execution unit causing said current instruction pointer to be copied into said second storage area, said destination address to be stored in said third storage area, and causing said handler to be executed.

9. In a computer system, a method comprising the steps of:

storing a first address in a first storage area;

accessing a first instruction identified by said first address for execution;

determining that said first instruction will cause a jump to be taken from said first address to a second address;

storing said first address in a second storage area; and storing said second address in a third storage area.

10. The method of claim 9, further including the step of executing a handler.

11. The method of claim 10, further including the step of:

executing code starting at said second address upon completion of said step of executing said handler.

12. In a computer system, a method for profiling, said method comprising the steps of:

storing a first address, said first address identifying a first instruction that is part of a program;

beginning execution of said program with said first instruction;

determining that a second instruction that is stored at a second address and that is part of said program will cause a branch from said second address to a third address;

storing said second address;

storing said third address;

suspending execution of said program;

executing a handler to store indications indicating instructions identified by addresses within an address range defined by said first address and said second address have been executed; and resuming execution of said program at said third address upon completion of said step of executing said handler.

13. The method of claim 12, wherein said step of storing said first address is performed in response to an initialization routine.

14. The method of claim 12, wherein said step of storing said first address is performed in response to execution of a branch to said first address.

15. In computer system, a method comprising the steps of:
 starting execution at a first instruction identified by a first address;
 determining that a second instruction instructs said computer system to transfer the flow of execution to a third instruction, said second instruction and said third instruction identified respectively by a second address and a third address;
 storing said second address in a first storage area;
 storing said third address in a second storage area; and
 storing an indication indicating instructions within an address range defined by said first address and said second address were executed.

* * * * *